(12) United States Patent
Codd et al.

(10) Patent No.: US 8,864,622 B2
(45) Date of Patent: Oct. 21, 2014

(54) DRIVE TRAIN APPARATUS

(75) Inventors: Andrew R. B. Codd, Thetford (GB); Martin G Smith, Mildenhall (GB)

(73) Assignee: Vitec Group PLC, Bury St. Edmunds (GB)

( * ) Notice: Subject to any disclaimer, the term of this patent is extended or adjusted under 35 U.S.C. 154(b) by 292 days.

(21) Appl. No.: 13/440,108

(22) Filed: Apr. 5, 2012

(65) Prior Publication Data
US 2012/0255383 A1 Oct. 11, 2012

(30) Foreign Application Priority Data
Apr. 8, 2011 (GB) .................................. 1106023.3

(51) Int. Cl.
| | |
|---|---|
| F16H 37/00 | (2006.01) |
| F16H 37/02 | (2006.01) |
| F16M 11/18 | (2006.01) |
| F16M 11/06 | (2006.01) |
| F16H 7/02 | (2006.01) |
| F16H 13/02 | (2006.01) |

(52) U.S. Cl.
CPC F16H 37/02 (2013.01); *F16H 7/02* (2013.01); *F16M 11/18* (2013.01); *F16H 13/02* (2013.01); *F16M 11/06* (2013.01)
USPC .................... 476/28; 476/27; 476/34; 396/58

(58) Field of Classification Search
USPC .................... 476/1, 12, 27, 28, 34, 35; 396/58
See application file for complete search history.

(56) References Cited

U.S. PATENT DOCUMENTS

| | | | | |
|---|---|---|---|---|
| 3,202,004 | A * | 8/1965 | Field ............................... | 476/16 |
| 5,125,488 | A * | 6/1992 | Green et al. ................ | 192/220.1 |
| 5,263,377 | A * | 11/1993 | Kleber ......................... | 74/15.84 |
| 6,895,835 | B2 * | 5/2005 | Cordeiro ..................... | 74/665 A |
| 7,658,128 | B2 * | 2/2010 | Sugano ....................... | 74/606 R |
| 7,918,758 | B2 * | 4/2011 | Di Giacomo et al. ........... | 476/66 |
| 8,366,575 | B2 * | 2/2013 | Ariga et al. ..................... | 474/91 |
| 8,601,895 | B2 * | 12/2013 | Serkh et al. .................. | 74/433.5 |
| 8,621,954 | B1 * | 1/2014 | Dellon et al. .............. | 74/490.01 |

FOREIGN PATENT DOCUMENTS

| | | |
|---|---|---|
| GB | 646145 | 11/1950 |
| JP | 61-102147 | 5/1986 |
| JP | 2-253030 | 10/1990 |
| JP | 2002-258672 | 9/2002 |

* cited by examiner

Primary Examiner — David M Fenstermacher
(74) Attorney, Agent, or Firm — Workman Nydegger

(57) ABSTRACT

A drive train apparatus (1) adapted for driving a pan and tilt head, which in use is intended to support a payload (for example a video camera), the apparatus includes respective successive drive elements (2, 3, 4) so coupled as to communicate a rotational movement applied at one end of the apparatus (1) from an output of a rotational input device (8) to a rotational output (16) disposed at the other end of the apparatus (1), in a manner whereby the rotational velocity of the rotational movement is reduced across the drive elements (2, 3, 4) thereby converting the torque applied to the input of each drive element (2, 3, 4) into an increased torque at the output of each drive element (2, 3, 4); a first stage one of the drive elements including a belt drive.

20 Claims, 2 Drawing Sheets

DRIVE TRAIN APPARATUS

CROSS-REFERENCE TO RELATED APPLICATIONS

This application claims priority to United Kingdom Application No. 1106023.3, filed Apr. 8, 2011, which is incorporated herein by specific reference.

BACKGROUND OF THE INVENTION

1. Field of the Invention

The invention relates to a drive train, in particular to a drive train for a robotic pan and tilt head for supporting a professional video camera such as a television camera or the like.

2. Problem to be Solved

It is known that there is a problem of quietly operating a drive train for a pan and tilt head at high speed. Known drive trains use gear drives, or toothed belt drives, for driving a load with high torque requirements. The meshing of teeth from each gear drive or toothed belt drive component at high speed produces an unacceptable amount of noise, which would be unintentionally picked up by the audio equipment of the supported camera whilst filming.

The invention seeks to provide a remedy/solution for these problems.

SUMMARY OF THE INVENTION

In a broad independent aspect, the invention provides a drive train for driving a pan and tilt head; said drive train comprising respective successive drive stages; said drive stages having an input; an output; and a coupling between respective stages; whereby said drive stages communicate a rotational movement applied at one end of said drive train from an output of a rotational input device to a rotational output disposed at the other end of said drive train, in a manner whereby the rotational velocity of said rotational movement is reduced across said drive stages, thereby converting the torque applied to the input of each drive stage into an increased torque at the output of each drive stage; said respective successive drive stages incorporating a gear drive; wherein prior to said gear drive said successive drive stages incorporate a belt drive and a friction drive.

Preferably, a first drive stage comprises a belt drive.

Preferably, a second drive stage comprises a friction drive.

Preferably, said friction drive imposes a velocity reduction; and said belt drive imposes a velocity reduction; wherein the velocity reduction of said friction drive is similar to the velocity reduction of said belt drive.

Preferably, said friction drive imposes a velocity reduction; and said belt drive imposes a velocity reduction; wherein the velocity reduction of said friction drive is similar to the velocity reduction of said belt drive.

Preferably, a third drive stage incorporates a means of rotating said rotational output at the same rotational speed as said output from said third drive stage.

Preferably, said third drive stage drive is a gear drive.

More preferably, said third drive stage is a final drive stage.

Preferably, said drive train incorporates a friction drive which incorporates a slip facility; whereby it functions as a mechanical fuse when a torque above a normal working threshold is applied to said friction drive.

Preferably, said drive train incorporates a friction drive; said friction drive incorporating co-operating members which are separable from each other to thereby function as a clutch.

Preferably, a drive train further comprising a first encoder member disposed at said output of said rotational input device.

Preferably, a drive train further comprising a second encoder member disposed at said output of said rotational output.

In a further broad independent aspect, the invention provides a pan and tilt head comprising a drive train for driving a pan and tilt head; said drive train with respective successive drive stages; said drive stages having an input; an output; and a coupling between respective stages; whereby said drive stages communicate a rotational movement applied at one end of said drive train from an output of a rotational input device to a rotational output disposed at the other end of said drive train, in a manner whereby the rotational velocity of said rotational movement is reduced across said drive stages, thereby converting the torque applied to the input of each drive stage into an increased torque at the output of each drive stage; said respective successive drive stages incorporating a gear drive; wherein prior to said gear drive said successive drive stages incorporate a belt drive and a friction drive; and a mount for camera in communication with said rotational output and whereby said mount rotates responsive to rotation at said rotational output.

Preferably, a pan and tilt head further comprising a first encoder member disposed at said output of said rotational input device.

Preferably, a pan and tilt head further comprising a second encoder member disposed at said output of said rotational output.

In a further broad independent aspect, the invention provides a drive train apparatus adapted for driving a pan and tilt head, which in use is intended to support a payload (for example a video camera), the apparatus comprising respective successive drive elements so coupled as to communicate a rotational movement applied at one end of said apparatus from an output of a rotational input device to a rotational output means disposed at the other end of said apparatus, in a manner whereby the rotational velocity of said rotational movement is reduced across the drive elements, thereby converting the torque applied to the input of each drive element into an increased torque at the output of each drive element; said respective successive drive elements incorporating a gear drive; characterised in that prior to said gear drive said successive drive elements incorporate at least one of or a succession of a belt drive and a friction drive.

This configuration provides a means of quietly communicating a high speed rotational velocity to the drive, which will not be picked up by any audio equipment located away from the supported camera.

Preferably, at a first stage one of said drive elements comprises a belt drive. The high speed, low torque input of the belt drive provides a rotational velocity, which is then subsequently reduced at each stage to provide the required torque for each stage; thereby enabling the drive to output an output torque which has been sufficiently increased to rotate a load with a high torque requirement. Furthermore, the belt drive communicates a low torque at high speed, which is quieter and faster than a friction drive and gear drive.

Preferably, at a second stage one of said drive elements comprises a friction drive. This enables the communication of torque which cannot be readily communicated by a belt drive and at high speeds is quieter than a gear drive.

More preferably, the velocity reduction imposed by said friction drive is substantially similar to the velocity reduction imposed by said belt drive. This enables the drive train to be packaged into a smaller space, when compared to other forms of drive.

Preferably, a third stage of said drive elements incorporates a means of rotating said rotational output means at the same rotational speed as said output from said third drive element. This provides a means of stabilising and controlling the rotational speed from the drive and communicating it to the attached load.

Preferably, said third stage drive element is a gear drive. This enables the communication of high torque at a low speed, which cannot be readily communicated by a belt or a friction drive.

Preferably, said third stage drive element is a final drive element. This provides a means of driving a load with a high torque requirement with drive train, which incorporates three distinct drive elements.

Preferably, said friction drive incorporates a slip facility and so functions in use as a mechanical fuse, when a torque above a normal working threshold is applied to said friction drive. This provides the means protecting the other components within the drive when an overload is applied to the friction drive.

More preferably, said friction drive incorporates means whereby co-operating members of said drive can be separated from each other to thereby function in use as a clutch. This provides the means of disengaging the drive, so that the camera platform which may be attached to the output shaft can be positioned manually in robotic/manual heads.

Preferably, a drive train apparatus further comprising a first encoder member disposed at said output of said rotational input device. This provides the means of determining the incremental position of the input shaft from the motor.

Preferably, a drive train apparatus further comprising a second encoder member disposed at said output of said rotational output means. This provides the means of determining the absolute position of the output shaft from the drive train.

In a further broad independent aspect, the invention provides a drive train apparatus adapted for driving a pan and tilt head, which in use is intended to support a payload (for example a video camera), the apparatus comprising respective successive drive elements so coupled as to communicate a rotational movement applied at one end of said apparatus from an output of a rotational input device to a rotational output means disposed at the other end of said apparatus, in a manner whereby the rotational velocity of said rotational movement is reduced across the drive elements, thereby converting the torque applied to the input of each drive element into an increased torque at the output of each drive element; characterised in that at a first stage one of said drive elements comprises a belt drive.

In a further broad independent, the invention provides a drive train for driving a pan and tilt head, said drive train comprising:
 a first drive stage comprising:
 a first input for receiving a first rotational movement at a first speed and a first torque;
 a first output for delivering a second rotational movement at a second speed and a second torque; and
 a belt drive for communicating the first rotational movement at said first input to said first output;
 a second drive stage comprising:
 a second input for receiving said second rotational movement;
 a second output for delivering a third rotational movement at a third speed and a third torque; and
 a friction drive for communicating the second rotational movement at said second input to said second output; and
 a third drive stage comprising:
 a third input for receiving said third rotation movement;
 a third output for delivering a fourth rotational movement to a pan tilt head at a fourth speed and a fourth torque;
 a gear drive for communication the third rotational movement at said third input to said third output.

Preferably, there is a speed reduction in said belt drive such that said second speed is less than said first speed and said second torque is greater than said first torque.

Preferably, there is a speed reduction in said friction drive such that said third speed is less than said second speed and said third torque is greater than said second torque.

Preferably, there is a speed reduction in said gear drive such that said fourth speed is less than said third speed and said fourth torque is greater than said third torque.

Preferably, said friction drive stage allows slippage between said second input and said second output when a predetermined torque is applied at said second output.

Preferably, said friction drive comprises a first wheel drivingly engaged by said second input and a second wheel drivingly engaged with said second output wherein in a first state said first wheel is in contact with said second wheel to transmit rotational movement from said second input to said second output and in a second state said first wheel is separated from said second wheel to provide a clutch function allowing said second output to rotate independent of said second input.

Preferably, a drive train further comprises a first encoder in rotational communication with said first input.

Preferably a drive train further comprises a second encoder in rotational communication with said third output.

More preferably, the invention provides a pan and tilt head comprising:
 a first drive stage comprising:
 a first input for receiving a first rotational movement at a first speed and a first torque;
 a first output for delivering a second rotational movement at a second speed and a second torque; and
 a belt drive for communicating the first rotational movement at said first input to said first output;
 a second drive stage comprising:
 a second input for receiving said second rotational movement;
 a second output for delivering a third rotational movement at a third speed and a third torque; and
 a friction drive for communicating the second rotational movement at said second input to said second output;
 a third drive stage comprising:
 a third input for receiving said third rotation movement;
 a third output for delivering a fourth rotational movement to a pan tilt head at a fourth speed and a fourth torque; and
 a gear drive for communication the third rotational movement at said third input to said third output; and
 a mount for a camera, said mount in communication with said third output such said mount rotates responsive to rotation at said third output.

Preferably, there is a speed reduction in said belt drive such that said second speed is less than said first speed and said second torque is greater than said first torque.

Preferably, there is a speed reduction in said friction drive such that said third speed is less than said second speed and said third torque is greater than said second torque.

Preferably, there is a speed reduction in said gear drive such that said fourth speed is less than said third speed and said fourth torque is greater than said third torque.

Preferably, said friction drive stage allows slippage between said second input and said second output when a predetermined torque is applied at said second output.

Preferably, said friction drive comprises a first wheel drivingly engaged by said second input and a second wheel drivingly engaged with said second output wherein in a first state said first wheel is in contact with said second wheel to transmit rotational movement from said second input to said second output and in a second state said first wheel is separated from said second wheel to provide a clutch function allowing said second output to rotate independent of said second input.

Preferably, a pan and tilt head further comprises a first encoder in rotational communication with said first input.

Preferably, a pan and tilt head further comprises a second encoder in rotational communication with said third output.

DETAILED DESCRIPTION OF THE FIGURES

Figure 1:
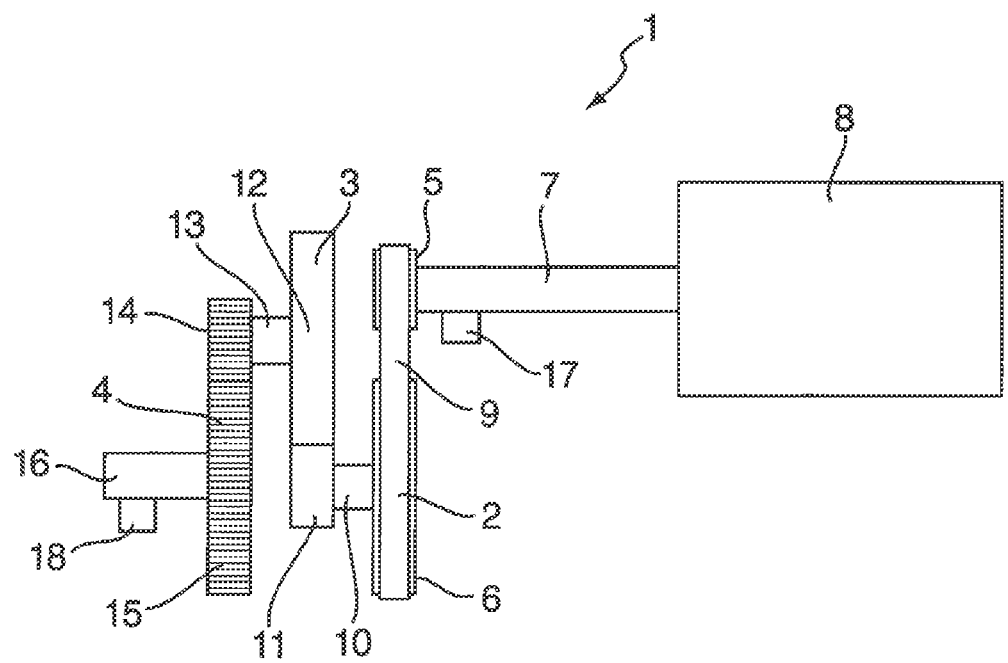
FIG. 1 shows an illustration of the drive train system.

FIG. 1 shows an illustration of the drive train system, which is generally indicated by 1. The drive train system 1 incorporates three drive stages 2, 3 and 4, which are coupled together. The first drive stage 2 is a belt drive element that incorporates a drive pulley 5 and a slave pulley 6, whereby the slave pulley 6 incorporates a larger diameter than the drive pulley 5. The drive pulley 5 is attached to a rotatable input shaft 7. The input shaft 7 is attached to, and rotationally driven by a motor 8, whereby the motor 8 is typically an electric motor. The drive pulley 5 is coupled to the slave pulley 6 via a drive belt 9, whereby the belt member 9 may be either a conventional shallow belt or a "V" belt configuration. The slave pulley 6 incorporates a centrally located driveshaft 10, which protrudes from the side of the slave pulley 6 in a lateral direction away from the motor 8.

The second drive stage 3 is a friction drive element attached to one end of the centrally located driveshaft 10, which is opposite the end attached to the slave pulley 6 of the belt drive element. The friction drive element incorporates a drive wheel 11, which abuts and engages the outer surface of a slave wheel 12. The slave wheel 12 incorporates a larger diameter than the drive wheel 11. The slave wheel 12 incorporates a centrally located drive shaft 13, which protrudes from the side of the slave wheel 12 in a lateral direction away from the belt drive element.

The third drive stage 4 is a gear drive element attached to one end of the centrally located driveshaft 13, which is opposite the end attached to the slave wheel 12 of the friction drive element. The gear drive element incorporates a drive gear 14 with an array of teeth located about its outer surface, which engage and mesh with the teeth located about the outer surface of a slave gear 15. The slave gear 15 incorporates a larger diameter than the drive gear 14. The slave gear 15 incorporates a centrally located drive shaft 16, which protrudes from the side of the slave gear 15 in a lateral direction away from the friction drive element.

The rotatable input driveshaft 7, which connects the belt drive element 9 to the motor 8 further incorporates an encoder device 17. The encoder device 17 is mounted on the outer surface of the drive shaft 7 at a location, which is positioned substantially towards the drive pulley 5 of the belt drive element.

The centrally located drive shaft 16, protruding from the slave gear drive 15 further incorporates an encoder device 18, which is mounted on the outer surface of the drive shaft 16 at a location, which is positioned substantially away from the slave gear 15.

Figure 2:
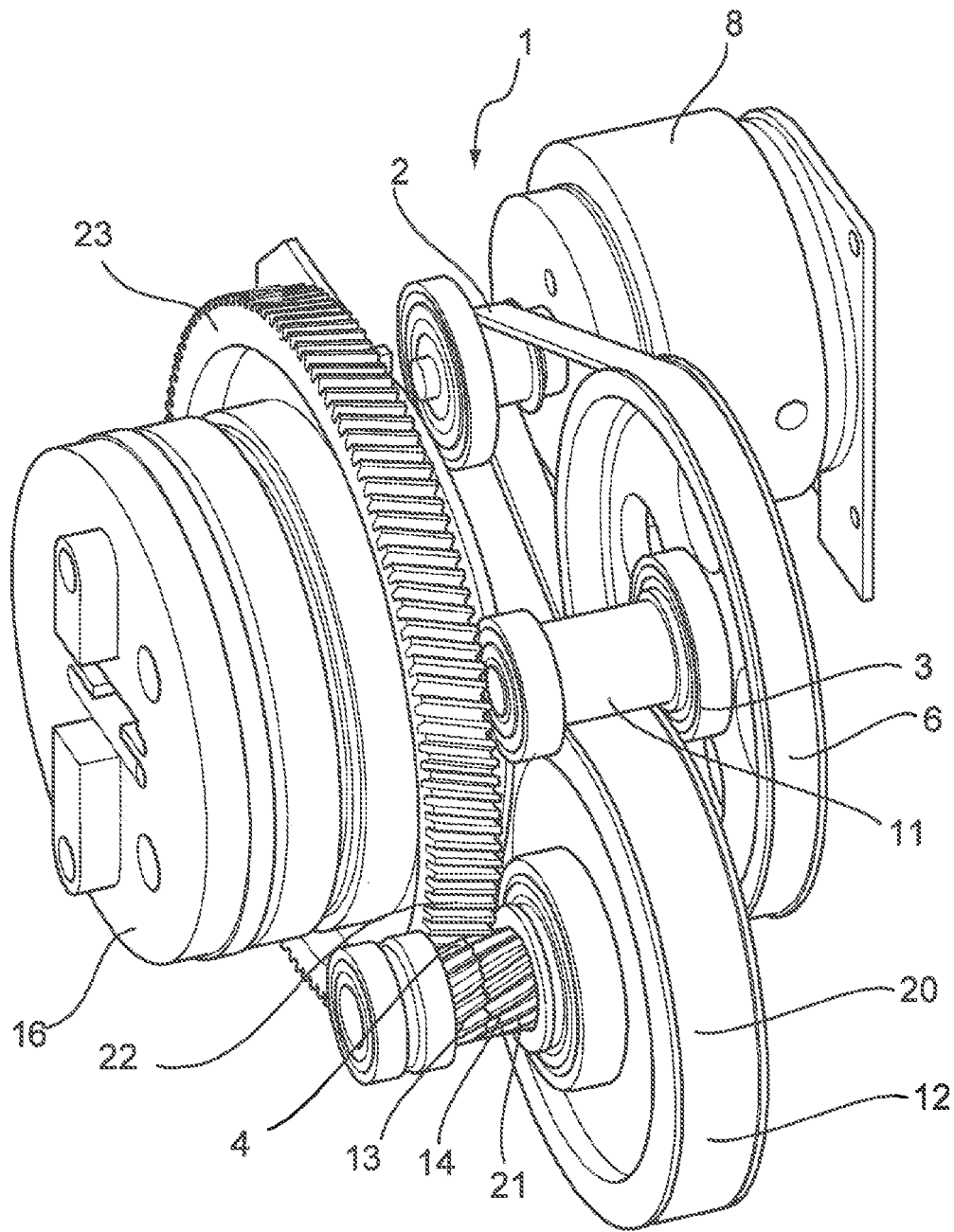
FIG. 2 shows a perspective illustration of the drive train system.

FIG. 2 shows a perspective view of a drive train system, which is substantially similar to the system illustrated in FIG. 1. The drive train system 1 incorporates a belt drive 2 coupled to the electric motor 8 and the drive wheel 11 of the friction drive 3. The drive wheel 11 of the friction drive 3 is an elongated drive wheel/shaft, which is centrally attached to the slave pulley 6 of the belt drive 2. The outer surface of the drive wheel 11 engages with the outer surface of a tyre member 20 located about the outer surface of the slave wheel 12 of the friction drive 3. The drive gear 14 of the gear drive 4 is an elongated gear, which is centrally attached to the slave wheel 12 of the friction drive 3. The drive gear 14 incorporates an array of teeth 21 located about its outer surface, whereby all the teeth 21 are uniformly angled to incorporate an increasing gradient from left to right. The teeth 21 of the gear drive 14 cooperate with an array of teeth 22 located about a ring member 23. The teeth of 22 of the ring member 23 are uniformly angled to incorporate a decreasing gradient from left to right, which facilitates the meshing with the teeth 21 of the drive gear 14. The outer ring member 23 is attached to a cylindrical drive shaft 16, which drives a load requiring a high torque.

In use, a rotational input force is applied to the drive train system via a motor, or any other rotational input device or means. The input shaft rotates the drive pulley of the belt drive element, which then subsequently turns the slave pulley via the connecting drive belt. The diameter of the slave pulley is larger than the drive pulley and provides a ratio in which the rotational velocity applied to the drive pulley, is reduced across the belt drive element and subsequently rotates the slave pulley at a reduced rotational velocity. The subsequent rotation of slave pulley rotates the protruding drive shaft, which functions as an elongated drive wheel of the friction drive element and subsequently rotates the abutted/engaged slave wheel of the friction drive element. The tyre member is typically formed from a high friction material to provide improved traction between the drive wheel and the slave wheel of the friction drive. The diameter of the slave wheel is larger than the drive wheel and provides a ratio in which the rotational velocity applied to the drive wheel, is reduced across the friction drive element and subsequently rotates the slave wheel at a reduced rotational velocity. The subsequent rotation of the slave wheel rotates the protruding drive shaft, which functions as an elongated drive gear of the gear drive element and subsequently rotates the engaged slave gear of the gear drive element. The diameter of the slave gear is larger than the drive gear and provides a ratio in which the rotational velocity applied to the drive gear, is reduced across the gear drive element and subsequently rotates the slave gear at a reduced rotational velocity. The subsequent rotation of the engaged slave gear rotates an attached cylindrical drive shaft at the same rotational velocity as the engaged slave gear.

The slave wheel of the friction drive incorporates an elongated drive gear which functions as a drive gear of the gear drive element. The teeth of the gear drive element mesh with the teeth of the slave gear which in turn rotates the rotate and output means.

The below table details the functional characteristics of each stage of the drive train:

| Stage | Drive Type | Drives Max Torque capability | Drives Noise | Max Torque | Max Speed |
|---|---|---|---|---|---|
| 1 | Friction belt | Low | Low | Low | High |
| 2 | Friction | Medium | Low | Medium | Medium |
| 3 | Gears | High | High | High | Low |

The first stage of the drive train uses a belt drive element, which is also the quietest drive method as can be seen from the table above. The belt drive receives a rotational input from an electric motor and rotates at the higher speed. If a gear drive element were used in this stage, it would generate an unacceptable amount of noise.

The second stage of the drive train also uses a quieter drive element, in the form of a frictional drive element. If a gear drive is used at this stage it would also generate an unacceptable amount of noise. Furthermore, if the belt drive element was used in this second stage, the belt would not be able to cope with the torque and slip due to the high torque requirements.

The third stage of the drive train uses a gear drive element. The gear drive element is the least quiet drive method and is used in the last stage of the drive train. However, the gear drive element rotates at the slowest speed, which therefore means the noise generated is acceptable. Furthermore, if the belt drive or friction drive elements are used at this stage, they would not be able to manage the torque and would slip due to the higher torque requirements.

The drive train has the following advantages:

The gear drive element of the drive train uses only one set of gears, which facilitates in the production of a smooth rotational output motion when compared to a drive train/element that uses multiple gears. This allows the camera to be reoriented whilst it is in use;

the friction drive element is very compact compared to a belt drive element of the same ratio, which facilitates in a drive train being packaged in a smaller space;

the friction drive element located at a second stage of the drive train is sufficient to cope with the required torque at this stage, which will not slip in normal use. However, in the event of an overloading torque being applied to the friction drive element, the drive wheel and slave wheel of the friction drive will slip. Therefore, functioning as a mechanical fuse, which prevents damage to other components within the drive train;

the friction drive element incorporates a tyre member, or the like, and the compliance of the tyre can be tuned so that any small amplitude, high frequency movements are filtered out between the two wheels of the friction drive. This filtering action is particularly useful in removing any small oscillations caused by an unstable servo loop.

the friction drive has the capability of functioning as a "clutch", which facilitates in the disengagement of the output shaft of the drive train from most of the drive system, such as the electrical motor and initial stages of the drive train. The "clutch" aspect of the drive, functions by moving the drive wheel and slave wheel apart from each other. This is particularly useful in order to allow the drive to be disengaged so that the camera platform, which is attached to the output shaft, can be positioned manually in robotic/manual support heads;

the encoder attached to the output of the drive train facilitates in acquiring the measurement of the absolute position of the output shaft;

the second encoder attached to the input shaft facilitates in acquiring the measure of the incremental position of the input shaft from the motor. Therefore, the two encoders provide a closed loop control means for providing the positioning of the supported camera, which is highly repeatable and allows a camera to be returned to the same position repeatedly to recreate the same shot.

What is claimed is:

1. A drive train for driving a pan and tilt head, the drive train comprising:
respective successive drive stages;
said drive stages having an input; an output; and
a coupling between respective stages;
whereby said drive stages communicate a rotational movement applied at one end of said drive train from an output of a rotational input device to a rotational output disposed at the other end of said drive train, in a manner whereby the rotational velocity of said rotational movement is reduced across said drive stages, thereby converting the torque applied to the input of each drive stage into an increased torque at the output of each drive stage; whereby one of said successive drive stages comprises a gear drive; prior to said gear drive is another said drive stage comprising a belt drive and a further said drive stage comprising a friction drive.

2. A drive train according to claim 1, wherein said rotational velocity of rotational movement is communicated to said drive belt.

3. A drive train according to claim 1, wherein said belt drive is prior to said friction drive.

4. A drive train according to claim 1, wherein said friction drive provides a velocity reduction; and said belt drive provides a velocity reduction; wherein said velocity reduction of said friction drive is similar to said velocity reduction of said belt drive.

5. A drive train according to claim 1, wherein said rotational output is operably connected to said gear drive; whereby in use, said rotational output is rotated at the same rotational speed as the output from said gear drive.

6. A drive train according to claim 5, wherein said further successive drive stage is a final drive stage.

7. A drive train according to claim 1, wherein said drive train incorporates a friction drive which incorporates a slip function; whereby a drive wheel and a cooperating slave wheel will slip when a torque above a normal working threshold is applied to said friction drive and thereby function as a mechanical fuse.

8. A drive train according to claim 1, wherein said drive train incorporates a friction drive; said friction drive incorporating a drive wheel which cooperates with the outside surface of a slave wheel; whereby said drive wheel and said slave wheel are separable from each other to thereby function as a clutch.

9. A drive train according to claim 1, further comprising a first encoder member, whereby said first encoder incorporates an element that is disposed on a rotatable member of said rotational input device.

10. A drive train according to claim 1, further comprising a second encoder member, whereby said second encoder incorporates an element that is disposed on a rotatable member of said rotational output.

11. A drive train according to claim 1, wherein said rotational velocity of rotational movement is communicated to said drive belt.

12. A drive train according to claim 1, wherein said belt drive is prior to said friction drive.

13. A pan and tilt head comprising:
a drive train for driving a pan and tilt head;
said drive train with respective successive drive stages;
said drive stages having an input; an output; and
a coupling between respective stages;
whereby said drive stages communicate a rotational movement applied at one end of said drive train from an output of a rotational input device to a rotational output disposed at the other end of said drive train, in a manner whereby the rotational velocity of said rotational movement is reduced across said drive stages, thereby converting the torque applied to the input of each drive stage into an increased torque at the output of each drive stage;
whereby one of said successive drive stages comprises a gear drive; prior to said gear drive is another said drive stage comprising a belt drive and a further said drive stage comprising a friction drive.

14. A pan and tilt head according to claim 13, wherein said friction drive provides a velocity reduction; and said belt drive provides a velocity reduction; wherein said velocity reduction of said friction drive is similar to said velocity reduction of said belt drive.

15. A pan and tilt head according to claim 13, wherein said rotational output is operably connected to said gear drive; whereby in use, said rotational output is rotated at the same rotational speed as the output from said gear drive.

16. A pan and tilt head according to claim 13, wherein said further successive drive stage is a final drive stage.

17. A pan and tilt head according to claim 13, wherein said drive train incorporates a friction drive which incorporates a slip function; whereby a drive wheel and a cooperating slave wheel will slip when a torque above a normal working threshold is applied to said friction drive and thereby function as a mechanical fuse.

18. A pan and tilt head according to claim 13, wherein said drive train incorporates a friction drive; said friction drive incorporating a drive wheel which cooperates with the outside surface of a slave wheel; whereby said drive wheel and said slave wheel are separable from each other to thereby function as a clutch.

19. A pan and tilt head according to claim 13, further comprising a first encoder member, whereby said first encoder incorporates an element that is disposed on a rotatable member of said rotational input device.

20. A pan and tilt head according to claim 13, further comprising a second encoder member, whereby said second encoder incorporates an element that is disposed on a rotatable member of said rotational output.

\* \* \* \* \*